Feb. 4, 1936.  H. C. JOHNSON  2,029,620
WAFFLE COOKER
Filed July 12, 1935
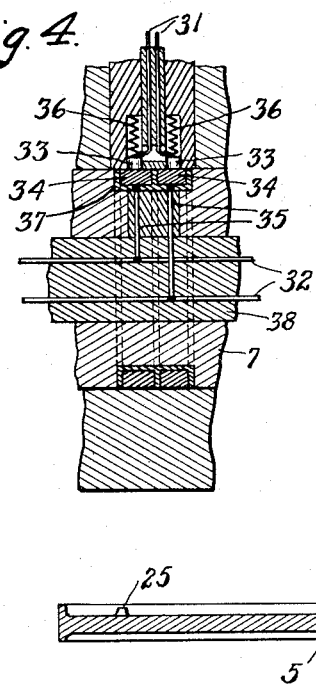
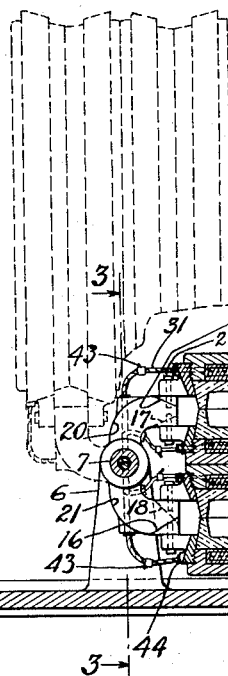
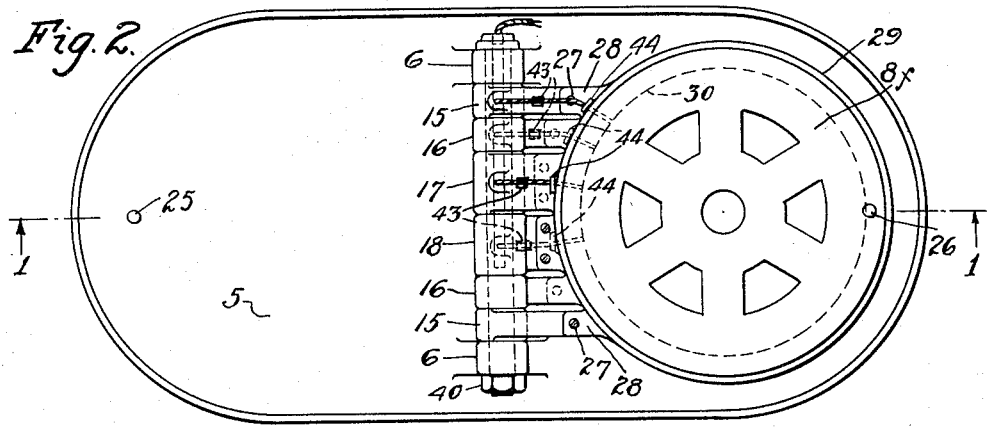
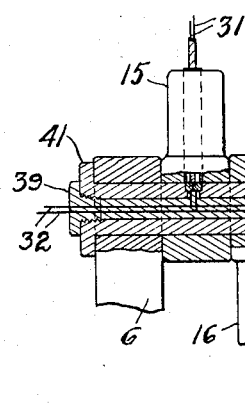
INVENTOR.
Henry C. Johnson
BY Robt. W. Pearson
ATTORNEYS.

Patented Feb. 4, 1936

2,029,620

UNITED STATES PATENT OFFICE 2,029,620

WAFFLE COOKER

Henry C. Johnson, Los Angeles, Calif.

Application July 12, 1935, Serial No. 31,052

8 Claims. (Cl. 53—10)

This invention relates to a culinary device for cooking waffles.

Among the objects of the invention are to provide a waffle cooker which is electrically heated in an improved, more economical manner; to provide a compact, superior construction for cooking a plurality of waffles at the same time and in which the progress of the cooking operation will be more readily observed; and to provide an improved device of this kind wherein the position of the dough-containing parts may be varied as the cooking of the dough progresses, thus handling the dough in a more satisfactory manner.

Another important object is to provide improved means for mounting in a dependable manner transparent glass containers to receive the dough and permit unobstructed inspection thereof as the cooking of each waffle progresses.

Other objects, advantages and improved features of construction may hereinafter appear.

Referring to the accompanying drawing, which illustrates what is at present deemed to be a preferred embodiment of the invention, Fig. 1 is a side elevation, parts being broken away and parts sectioned in order to disclose the interior construction.

Fig. 2 is a plan view of Fig. 1.

Fig. 3 is a partly sectional and partly elevational view of the hinge assembly, taken on line 3—3 of Fig. 1.

Fig. 4 is an enlarged fragmental section of electric connections shown in the center portions of Fig. 3.

Referring in detail to the drawing, the supporting base 5 consists of an elongated plate having rounded ends and having at its mid-length a pair of upstanding arms 6 which are spaced apart as shown. A horizontal hinge pin 7 is supported by the upper portions of the arms and bridges the space between them. Said hinge pin serves to attach in a swinging manner the paired waffle-containers 8, 9, 10 and 11.

Said waffle containers are hinged to the arms 6 by means of the common pivot pin 7 upon which they may swing independently of each other. They are shown in a superimposed relation in the right hand portion of Fig. 1, the members 8 and 9 being combinable to contain one waffle between them, and the members 10 and 11 being combinable to contain another waffle.

The waffle member 8 is shown having two pivot arms 15 which are widely spaced apart, thus leaving room between them to receive the spaced arms 16 of the member 11 and also room to receive the pivot arms 17 and 18 which belong respectively to the swingable members 9 and 10, the latter members each being furnished with a single arm. Each waffle container is furnished with a glass portion indicated by its number plus the letter $x$ and with a metallic skeletal frame indicated by its number plus the letter $f$.

Adjacent to the hinge pin 7 the arms 15 and 17 are deflected in a curved manner toward one side, while the arms 16 and 18 are deflected in the opposite direction, thus making it possible to swing the complete waffle containing assembly into a like superimposed laterally extending position at either side of the hinge pin 7. The base plate 5 extends far enough at opposite sides of the hinge pin to permit the waffle containing assembly to rest thereon, upstanding lugs 25 on the base plate cooperating with lugs or feet 26 on the outer waffle containers.

Screw bolts 27 are provided to secure the waffle containers to the various hinge arms. All said hinge arms are arched outwardly the same distance from the hinge pin, and where they receive said screw bolts are shaped as shown in the full line portion of Fig. 1, where the upper bolt 27 is shown securing the member 8 to the arm 15 and the next bolt therebelow secures the member 9 to the arm 17.

The bolts 27 pass through lugs 28 formed on the rings 29 each of which is of a frusto-conical character and is internally screwthreaded throughout its wider portion and is internally smooth throughout its narrower portion. The glass portions 8$x$, etc. of each waffle container 8, etc., has the outer face of its periphery inclined to fit against the unthreaded portion of the ring within which it is fitted. Hence each skeletal frame when screwed into place within the ring with which it cooperates acts as a clamping member to hold the associated glass waffle container in place.

The electric heating elements 30 supply cooking heat to the waffle and are mounted within the skeletal frame in any manner preferred by those skilled in electric arts. Current is supplied to them by the conductors 31 and 32, the latter leading through the nonrotatable hinge pin 7. In Fig. 4 are shown brushes 33 which travel along rings 34 to complete the circuit between the conductors 31 and leads 35 from the conductors 32. Said conductors 31 are shown having spring portions 36 which act upon the brushes 33. Suitable insulators 37 are provided for the rings 34.

An insulating core 38 is provided for the wires 32, said core being fitted within a bore provided therefor within the hinge pin 7 and being held in place by the nut 39.

Manually controllable switches 45 are positioned between the conductors 31 and the electric heating elements 30, to open and close the electric circuits when desired, and the thermostatic control elements 44 are positioned adjacent to the waffle containers 8, 9, 10 and 11, in circuit with the conductors 31, to automatically control the heat generated within the said waffle containers.

During the cooking of the waffle the members 8 and 9 should be kept together to cooperate in cooking a waffle between them; and the same thing is true of the members 10 and 11. But if desired the pair of members which cooperate to cook one waffle may be swung to one side of the hinge pivot 7 while the other pair remains on the other side of the hinge, thus making it possible to get an unobstructed view of both waffles during cooking. Or, after the cooking has progressed sufficiently, the waffle containing members may be poised in the upstanding position indicated by dotted lines in Fig. 1, where the cooking can be observed from both sides. A clamping nut 40 at one end of the hinge cooperates with a head 41 at the other end thereof to apply the desired amount of friction to the hinge arms 15, 16, 17 and 18.

By this invention a frame structure is provided which is adapted to securely and safely support glass containers, thereby avoiding the necessity of using containers made of metal, for example, aluminum, which some authorities consider objectionable owing to the chemical reactions that may take place.

I claim:

1. A waffle cooker comprising a base, supporting means upstanding from said base, a plurality of waffle containers assembled in a superimposable relation to each other, means to hinge said containers to said supporting means to swing about a common hinge pivot, and means to electrically heat each of said containers.

2. A waffle cooker comprising a base, supporting means upstanding from said base, a plurality of waffle containers assembled in a superimposable relation to each other, means to hinge said containers to said supporting means to swing from a superimposed assembly at one side of said pivot to a like assembly at the opposite side of said pivot, and means to heat said containers electrically to cook the waffles.

3. A waffle cooker comprising a glass container to receive the dough, a skeletal frame supporting said container and affording openings to observe through said glass the progress of the cooking of the waffle, and means to supply cooking heat electrically to a waffle being cooked in said container.

4. A waffle cooker comprising a skeletal frame, electric heating elements occupying the solid portions of said frame, and transparent glass containers inclosed within said skeletal frame adapted to receive dough for cooking into waffles, the dough being cooked being visible through the interstices of said skeletal frame.

5. In a waffle cooker, a waffle containing member consisting of a circular skeletal frame member having an externally screw threaded periphery, a circular glass waffle container, and a circular clamping ring having an unthreaded internal peripheral portion at one side to fit around said container and a screw threaded internal peripheral portion at the opposite side to screw on to the threaded portion of said frame member.

6. The subject matter of claim 5 and, the inner peripheral face of said ring converging toward the unthreaded side thereof to receive said container with a wedging fit.

7. In a waffle cooker, a transparent waffle container, a skeletal frame member, and a rim member enclosing both of said members to hold them in an assembled relation.

8. A waffle cooker comprising a support, two pairs of members hinged to said support, the members of each of said pairs being swingable into a superimposed relation wherein they form a cooking chamber between them, said members having transparent portions affording inspection of the waffle during cooking and being swingable to separate positions to permit observation of both of the waffles during cooking.

HENRY C. JOHNSON.